Dec. 23, 1958   M. J. LANE   2,866,156
JEEPING ELECTRODES
Filed Feb. 8, 1957   6 Sheets-Sheet 1
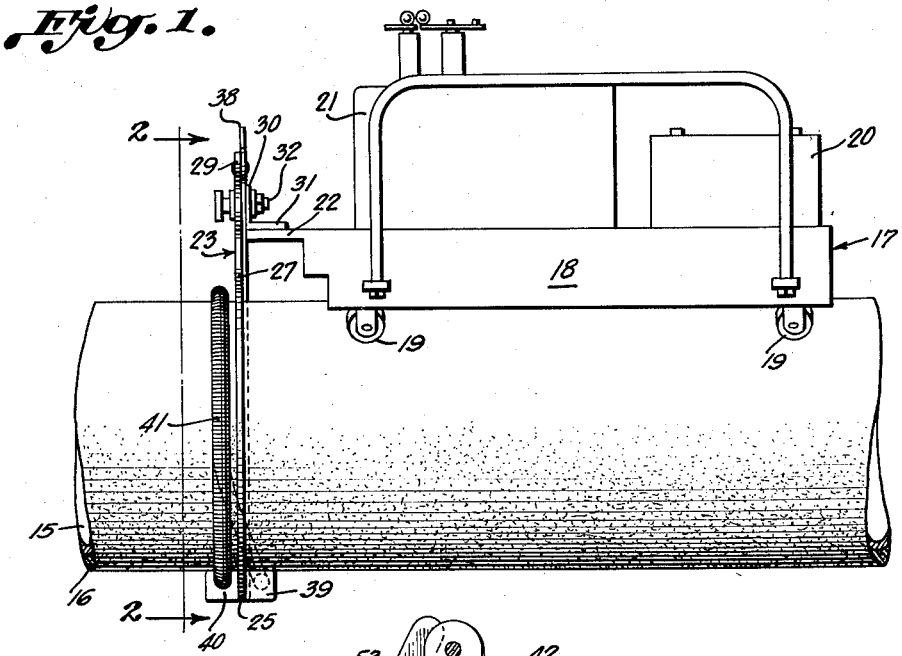
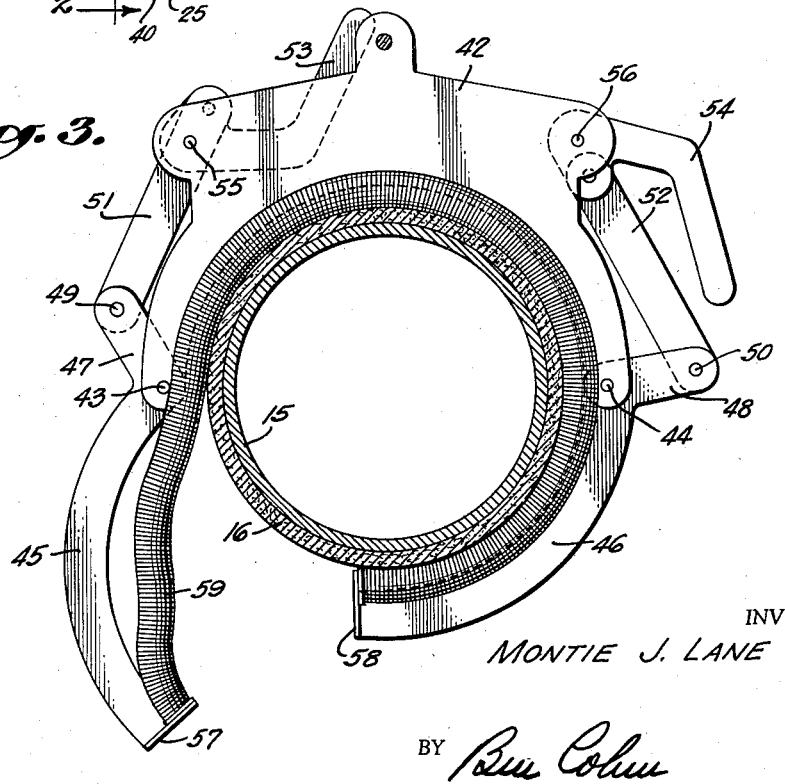
INVENTOR
MONTIE J. LANE
BY
ATTORNEY

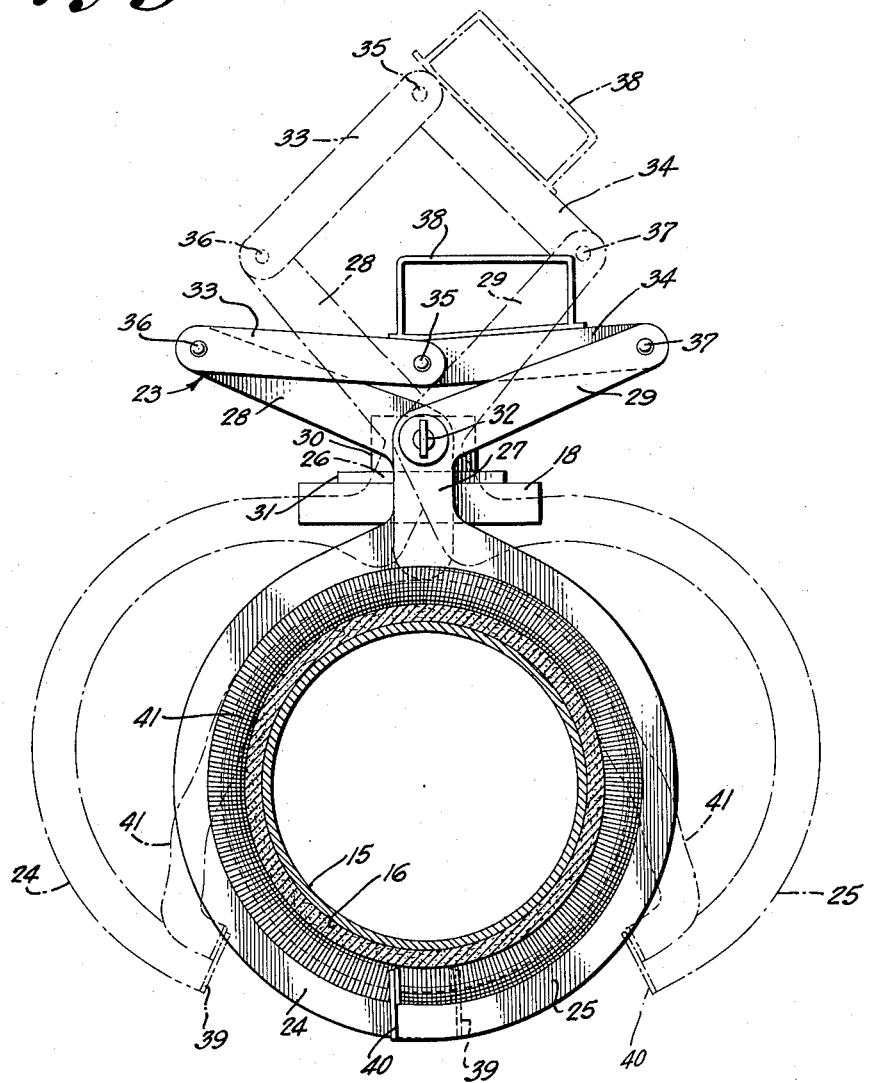

Dec. 23, 1958　　　　　M. J. LANE　　　　　2,866,156
JEEPING ELECTRODES

Filed Feb. 8, 1957　　　　　　　　　　　　6 Sheets-Sheet 3

INVENTOR
MONTIE J. LANE
BY
ATTORNEY

Dec. 23, 1958 M. J. LANE 2,866,156
JEEPING ELECTRODES
Filed Feb. 8, 1957 6 Sheets-Sheet 4
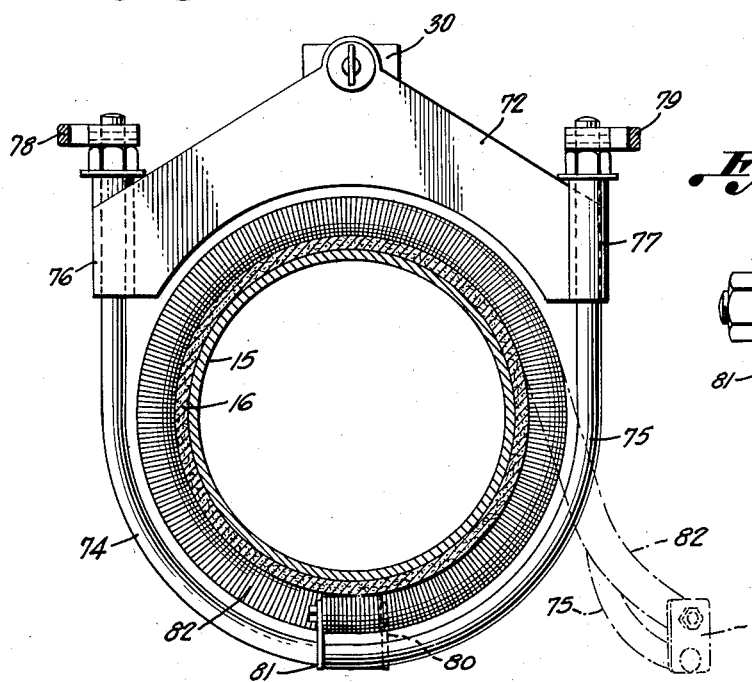
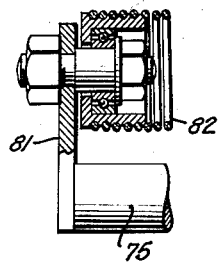
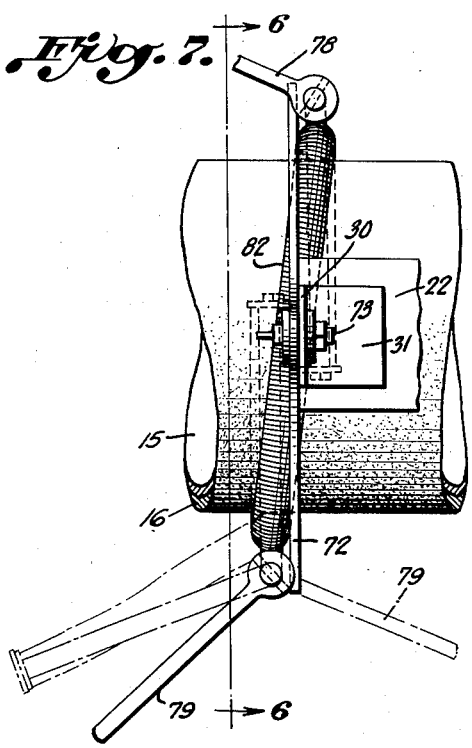
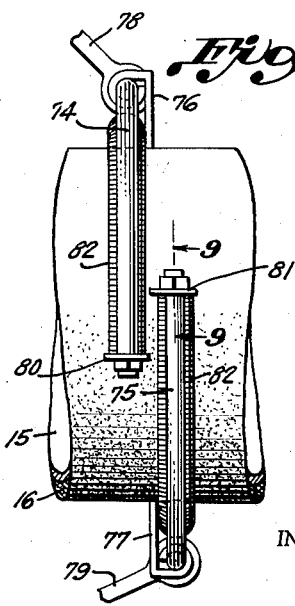
INVENTOR
MONTIE J. LANE
BY
ATTORNEY Dec. 23, 1958

M. J. LANE 2,866,156

JEEPING ELECTRODES

Filed Feb. 8, 1957

INVENTOR
MONTIE J. LANE
BY
Bill Cohen
ATTORNEY

Dec. 23, 1958  M. J. LANE  2,866,156
JEEPING ELECTRODES
Filed Feb. 8, 1957  6 Sheets-Sheet 6
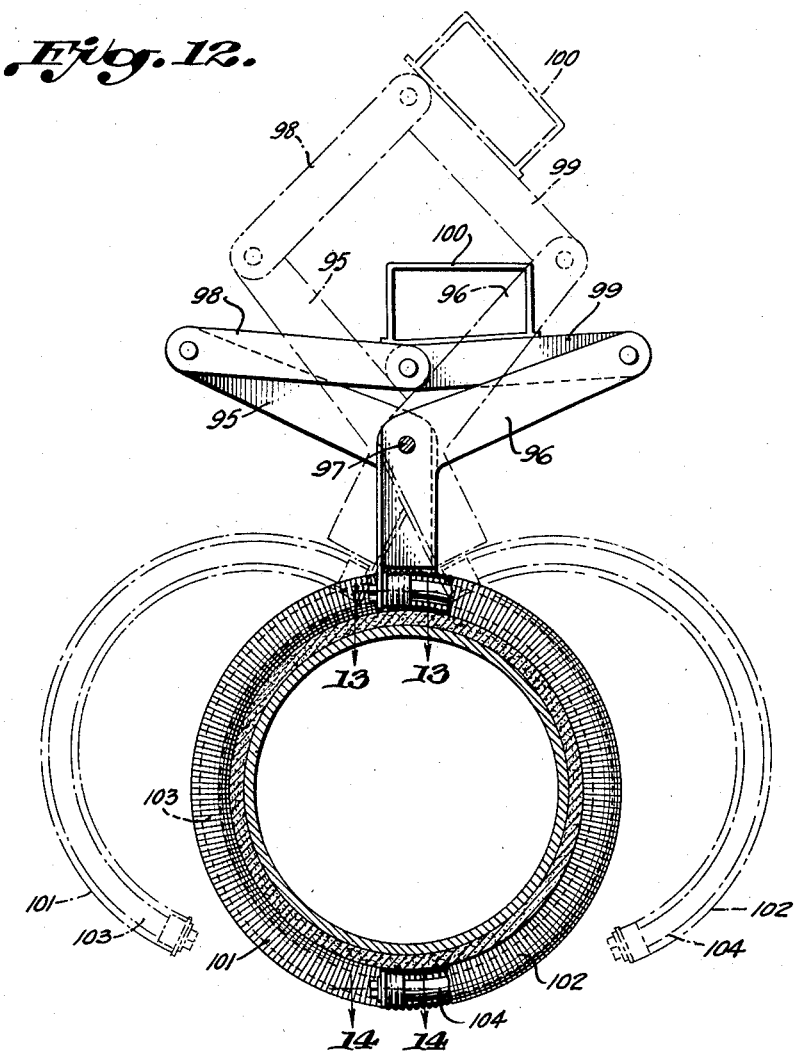
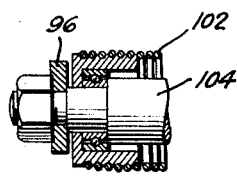
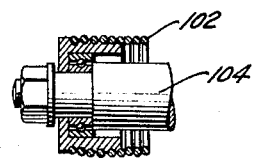
INVENTOR
MONTIE J. LANE
BY
ATTORNEY United States Patent Office 2,866,156
Patented Dec. 23, 1958

2,866,156
JEEPING ELECTRODES
Montie J. Lane, Langhorne, Pa.
Application February 8, 1957, Serial No. 639,003
10 Claims. (Cl. 324—54)

The present invention relates to electrodes such as are used in insulation testing devices and constitutes an improvement over my co-pending application, Serial Number 527,460, for Jeeping Electrodes, filed August 10, 1955, now abandoned.

As pointed out in my co-pending application, electrodes are used in testing the insulating coating on cylindrical members such as conductive pipes used in natural gas or petroleum lines. These pipes vary in diameter from six to thirty inches and each pipe is thirty feet or more in length before being joined to other pipe sections to form a pipe line. It is customary to coat each pipe section before assembly with other pipe sections and after the coating operation, each pipe section is tested for flaws in the coating. In testing the pipe section, it is laid upon a number of spaced apart horses or other suitable supports to enable the coil spring ring electrode to encircle the pipe and move along the pipe. Upon reaching the support, it is necessary to disengage the ring electrode from the pipe by separating the joined ends of the ring, reassemble the ring on the other side of the support and continue the testing. This operation is repeated each time a support is encountered. As a result, there is a considerable loss in time and effort each time the ring encounters a support.

One object of the present invention is to provide a coil spring ring electrode in which the two ends of the coil forming the ring are not connected and which can be readily separated upon reaching a support and readily brought together again after passing the support.

In my prior application, reference was made to two patents to D. E. Stearns, Nos. 2,332,182 and 2,497,804, and several improvements and advantages over these Stearns patents were presented in said application. As pointed out in my prior application, there is a distinct advantage in the use of a coil spring as the electrode due to the fact that a rolling action rather than a scraping action is obtained. It was further pointed out that the advantage of my prior construction over the Stearns Devices resided in the fact that the propelling means extended further down than in the Stearns construction to reduce the amount of lag in the coiled spring.

A further object of the present invention resides in the provision of a propelling device which engages the coil spring electrode in such manner as to maintain the electrode in a substantially vertical plane as it moves along the pipe being tested.

Other objects and advantages of the present invention will be readily apparent from the following detailed description taken in connection with the accompanying drawings, wherein:

Figure 1 is a side elevation of a section of pipe with a device constructed in accordance with this invention mounted thereon and showing one form of coil spring support;

Figure 2 is a vertical sectional view taken on the line 2—2 of Figure 1;

Figure 3 is a vertical sectional view showing a modified form of the coil spring support;

Figure 6 is a vertical sectional view taken on line 6—6 of Figure 7 showing a third modification of a coil spring support;

Figure 7 is a top plan view of Figure 6;

Figure 8 is a bottom plan view of Figure 6;

Figure 9 is an enlarged sectional view taken on line 9—9 of Figure 8;

Figure 12 is a vertical sectional view of a fifth modification of the coil spring support;

Figure 13 is an enlarged sectional view taken on line 13—13 of Figure 12; and

Figure 14 is an enlarged sectional view taken on line 14—14 of Figure 12.

Figure 4:
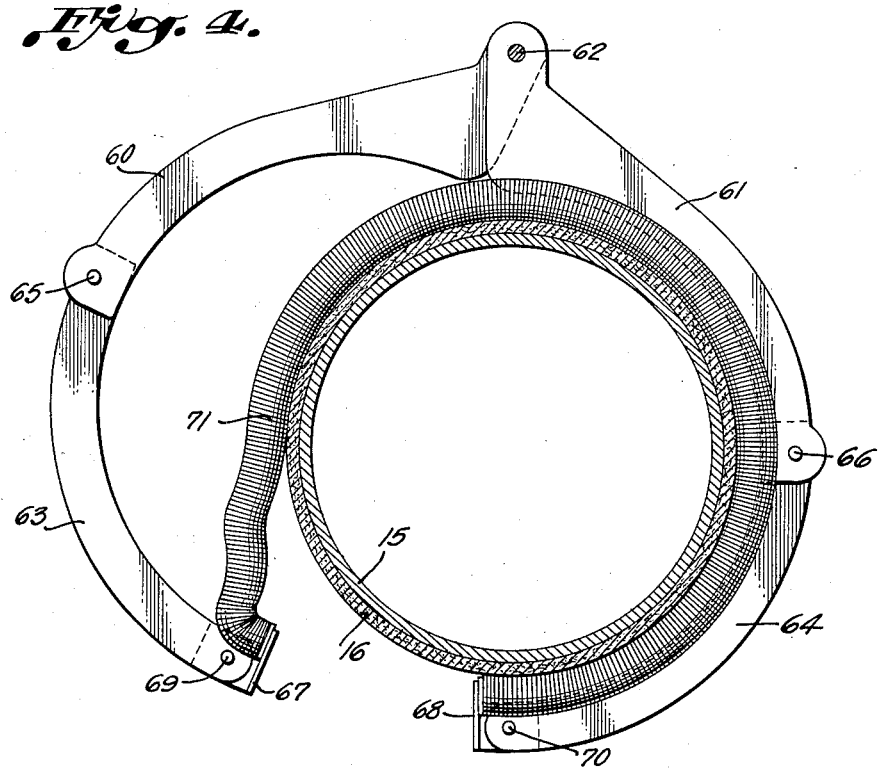
Figure 4 is a vertical sectional view showing a second modification of the coil spring support.

Referring to the drawings in detail and particularly to Figures 1 and 2, numeral 15 denotes the pipe and numeral 16 denotes the pipe coating being tested. The testing apparatus 17 may be of the type shown in the earlier Stearns patent mentioned above and comprises generally a carriage 18 having wheels 19 for supporting the carriage for movement along the pipe 15. The carriage supports the batteries 20 and a cabinet 21 housing the electrical equipment used in the testing for flaws. The forward end of the carriage is provided with a support 22 to which is attached the propelling means for the coil spring electrode. The structure thus far described is similar to the structure disclosed in my aforesaid co-pending application.

In the modification shown in Figures 1 and 2, the propelling means 23 consists of a pair of complementary semi-circular arms 24, 25 adapted to encompass the pipe 15 when the arms are in closed position. The upper ends of the arms 24 and 25 are provided with vertical portions 26 and 27 which terminate in outwardly extending arms 28 and 29. The upper ends of the vertical portions 26 and 27 are pivotally connected to the vertical leg 30 of a bracket 31 by means of a pivot 32. The ends of the arms 28 and 29 are connected to each other by means of a pair of levers 33, 34 pivoted to each other at 35 and pivoted to the arms 28 and 29 at 36 and 37. A handle 38 is mounted on the arm 34 for a purpose to be described.

The lower free ends of the semi-circular arms 24 and 25 have rigidly secured thereto plate members 39 and 40. As seen in Figure 1, the plate members extend in opposite directions. The coil spring electrode indicated by numeral 41 is of a length to encompass the pipe being tested and has its free ends swivelly connected to the plate members 39 and 40. As seen in Figure 2, the lower ends of the arms 24 and 25 overlap slightly and therefore the ends of the coil spring overlap to insure complete surface testing.

In the operation of the above described apparatus, the carriage is placed at one end of the pipe to be tested with the propelling means in the dotted line position shown in Figure 2. By pressing downwardly on handle 38, the arms 24 and 25 are brought together to encompass the pipe as shown in Figure 1 and in full line position in Figure 2. The testing apparatus is then moved along the pipe in the usual manner. Upon reaching an obstruction, the handle 38 is pulled upwardly, thereby spreading the arms and enabling the electrode to pass the obstruction, whereupon downward pressure on the handle will close the circular arms whereby the testing may be continued.

In the modification shown in Figure 3, the propelling means comprises a half yoke 42 adapted to straddle the upper half of the pipe 15. Pivotally secured to the lower ends of the yoke 42 at points 43 and 44 are a pair of circular arms 45 and 46. The upper ends of the circular arms terminate in angular portions 47, 48, the ends of which are pivotally connected at 49 and 50 to levers 51 and 52 respectively, which in turn are pivoted to bell crank members 53 and 54. The bell crank members are pivoted to the yoke 42 by pivots 55 and 56. The yoke 42 may be mounted to the bracket 31 in the same manner as described in connection with the form of invention shown in Figures 1 and 2. The lower ends of the circular arms 45 and 46 are provided with plate members 57 and 58 to which the free ends of the coil spring 59 are swively connected in the same manner as previously described.

The device described in the preceding paragraph operates generally in the same manner as the form shown in Figures 1 and 2 except in the manner of spreading the arms 45 and 46. As shown, raising of the bell crank members 53 and 54 causes the spreading of the arms and lowering of these members brings the arms together.

Figure 5:
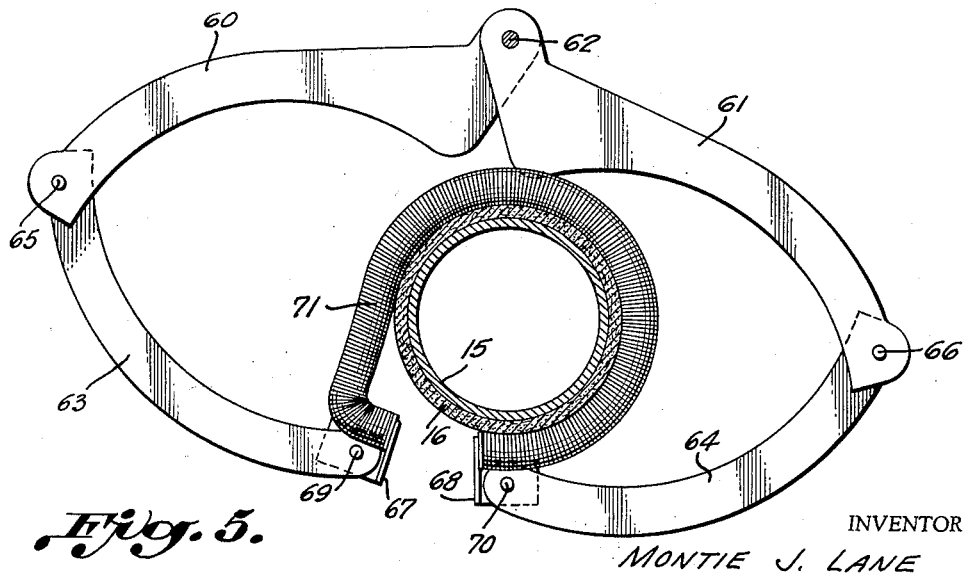
Figure 5 is a vertical sectional view of the modified support of Figure 4 as applied to a smaller diameter pipe.

In the modification shown in Figures 4 and 5, the coil spring support is of articulated form and may be adjusted for use with pipes of different diameter. For purpose of illustration, the pipe shown in Figure 4 has an outer diameter of fourteen inches and the pipe shown in Figure 5 has an outer diameter of six inches. Any pipe, the diameter of which varies between these limits, may be tested with the support shown.

In this form of the invention, the support comprises a two part yoke member having circular arms 60 and 61 pivoted to the supporting bracket at 62. The lower circular members 63 and 64 are pivoted at its upper ends to members 60 and 61 at points 65 and 66, and to the plate members 67 and 68 at points 69 and 70. The coil spring 71 is swively connected to the plates 69 and 70.

The mode of operation of the present support is similar to those previously described except that no specific separating means for the arms is required.

In the form of invention shown in Figures 6 to 9 inclusive, the coil supporting arms are swively mounted instead of being pivoted as previously described. The yoke member 72 is secured to the bracket 31 by means of the bolt member 73 in a manner previously described. The spring supporting arms are in the form of bent rods 74, 75, the upper straight ends of which extend through tubular bearings 76, 77 formed at each side of the yoke member 72. Handle members 78, 79 are mounted at the upper ends of the rods for swinging the rods to open or closed position. The lower curved ends of the rods overlap each other in closed position and carry plate members 80 and 81 to which the ends of the coil spring 82 are swively connected. Figure 9 discloses a preferred form of swivel connection which may be employed with the various modifications described.

Figure 10:
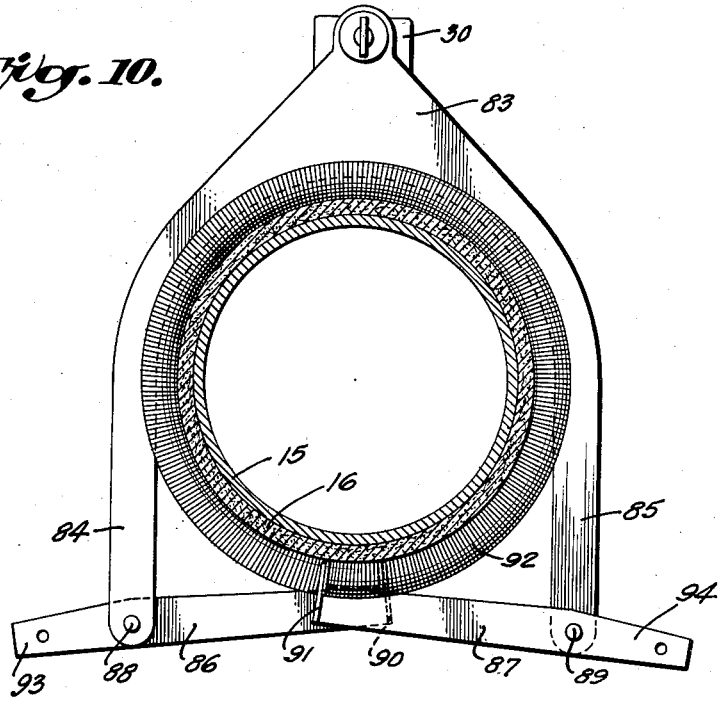
Figure 10 is a vertical sectional view of a fourth modification of the coil spring support taken on the line 10—10 of Figure 11.
Figure 11:
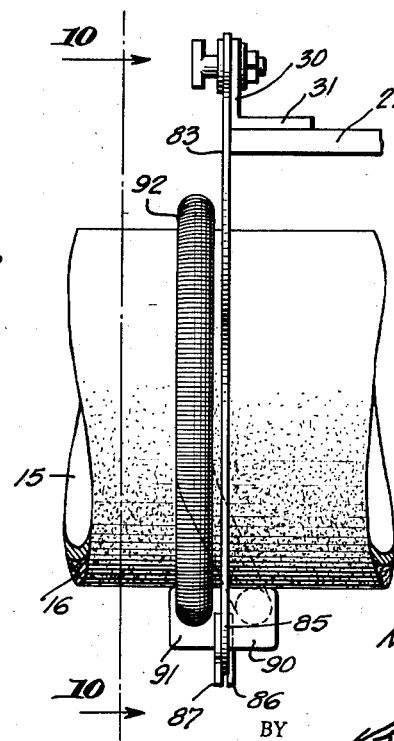
Figure 11 is a side view of Figure 10.

In the modification shown in Figures 10 and 11, the arm supporting means is in the form of a full yoke member 83. As shown in this form of the invention, the arms 84, 85 of the yoke straddle the pipe and terminate slightly below the bottom of the pipe. The coil separating means comprises a pair of levers 86, 87 pivoted to the arms 84, 85 at points 88, 89, the inner ends of the levers carrying plates 90 and 91 to which the ends of coil spring 92 are swively mounted. The ends 93, 94 of the levers constitute handle portion for raising or lowering the levers for spreading or closing the coil spring.

The modification shown in Figures 12, 13 and 14 is adapted for large diameter pipe and employs two coil springs to avoid corona loss. The spring separating means is in the form of a toggle arrangement similar to the arrangement shown in Figures 1 and 2 and consists of the L-shaped levers 95, 96 pivoted to the bracket 22 (not shown) by bolt 97. The levers 95 and 96 are pivotally connected by means of the levers 98 and 99, with lever 99 carrying the handle 100. The coil springs indicated by the numerals 101 and 102 are supported by semi-circular rods or tubes 103 and 104 which fit within the coil springs. The upper end of the rod 104 is secured to the lever 96 for movement therewith and each end of the coil spring 102 is swively connected to the respective ends of the rod 104. Similarly, the upper end of rod 103 is rigidly secured to the lever 95 and each end of the coil spring 101 is swively connected to the respective ends of the rod 103. The two levers may be insulated from each other by any suitable insulating means.

The operation of this form of the invention is similar to the operation of the form shown in Figures 1 and 2. An upward pull on handle 100 will cause spreading of the semi-circular arms 103 and 104 for the purpose previously described.

It will be apparent from the foregoing description that the present invention is well adapted to accomplish the objects set forth. While numerous embodiments have been shown, it will be understood that other forms of the invention may be used without departing from the spirit of the invention. Therefore, I do not wish to be limited to the particular construction herein shown except as may be required by the appended claims considered with reference to the prior art.

Having thus described the invention, what is claimed is:

1. An electrical exploring device for detecting defects in an insulating coating on an elongated member which comprises an exploring electrode in the form of a coiled spring adapted to extend about such member and completely encompass said member, and having ends free to separate, and means engaging and forming a movable electrical contact with said spring, at a position remote from the surface of said member for connecting said spring to a high voltage testing circuit and for rolling said spring along such elongated member, said means comprising at least two members substantially encompassing said elongated member and having free ends connected to the free ends of the coiled spring, said members arranged to separate the free ends of the coiled spring.

2. An electrical exploring device as defined in claim 1, said free ends of the coiled spring overlapping each other.

3. An electrical exploring device as defined in claim 1, said two members being pivotally connected at a common point.

4. An electrical exploring device for detecting defects in an insulating coating on an elongated member which comprises an exploring electrode in the form of a coiled spring adapted to extend about such member and completely encompass said member, and having ends free to separate, and means engaging and forming a movable electrical contact with said spring, at a position remote from the surface of said member for connecting said spring to a high voltage testing circuit and for rolling said spring along such elongated member, said means comprising a yoke adapted to straddle the elongated member and having the arms of the yoke separated a distance slightly larger than the distance across the elongated member, a lever pivotally connected to each of the yoke arms, the free end of each lever being swively connected to the free ends of the coiled spring and arranged to separate said spring ends.

5. An electrical exploring device as defined in claim 4, and handle means associated with the levers to move the free ends of the levers away from the elongated member.

6. An electrical exploring device as defined in claim 4, said yoke being a half yoke and the levers being of curved form.

7. An electrical exploring device as defined in claim 4, said yoke being a full yoke and the levers being substantially straight.

8. An electrical exploring device for detecting defects in an insulating coating on an elongated member which comprises an exploring electrode in the form of a coiled spring adapted to extend about such member and completely encompass said member and having ends free to separate, and means engaging and forming a movable electrical contact with said spring, at a position remote from the surface of said member for connecting said spring to a high voltage testing circuit and for rolling said spring along such elongated member, said means comprising a plurality of members pivotally secured together to substantially encompass the elongated member with two of the members having free ends, said free ends being connected to the free ends of the coiled spring and arranged to separate said spring ends.

9. An electrical exploring device as defined in claim 8, said members being four in number.

10. An electrical exploring device as defined in claim 8, said free ends of the members being pivotally connected to plate members and said free ends of the coiled spring being swivelly connected to said plate members.

References Cited in the file of this patent

UNITED STATES PATENTS

| | | |
|---|---|---|
| 2,332,182 | Stearns | Oct. 19, 1943 |
| 2,497,804 | Stearns | Feb. 14, 1950 |
| 2,558,883 | Stearns | July 3, 1951 |
| 2,573,815 | Smith | Nov. 6, 1951 |
| 2,615,077 | Tinker | Oct. 21, 1952 |
| 2,629,002 | Tinker | Feb. 17, 1953 |